(12) United States Patent
Kimble (10) Patent No.: US 7,182,311 B2
(45) Date of Patent: Feb. 27, 2007

(54) IN-LINE SOLENOID VALVE (75) Inventor: James D. Kimble, DeKalb, IL (US)

(73) Assignee: Robertshaw Controls Company, Richmond, VA (US)

( * ) Notice: Subject to any disclaimer, the term of this patent is extended or adjusted under 35 U.S.C. 154(b) by 69 days.

(21) Appl. No.: 11/089,082

(22) Filed: Mar. 24, 2005

(65) Prior Publication Data
US 2006/0214126 A1 Sep. 28, 2006

(51) Int. Cl.
*F16K 31/02* (2006.01)
(52) U.S. Cl. .................................. 251/129.21
(58) Field of Classification Search ............ 251/129.21
See application file for complete search history.

(56) References Cited

U.S. PATENT DOCUMENTS 4,760,832 A * 8/1988 Smith et al. ................ 123/525

6,302,337 B1 * 10/2001 Kimmel ....................... 239/408

* cited by examiner

Primary Examiner—J. Casimer Jacyna
(74) Attorney, Agent, or Firm—Reinhart Boerner Van Deuren P.C.

(57) ABSTRACT

A flow through solenoid valve comprises a housing, a coil encircling the housing, and a hollow plunger slidably positioned in the housing. The housing has an inlet, a seat, and an outlet. The hollow plunger has a fixed segment and a poppet segment. The poppet segment includes a poppet conduit and is slideable within the housing. The spring encircles the poppet segment and biases the poppet segment toward the seat. The solenoid valve is energized to disengage the poppet segment from the seat. When the poppet and the seat are disengaged, a gas is permitted to flow through the hollow plunger. The solenoid valve is de-energized to engage the poppet segment and the seat. When the poppet and the seat are engaged, the gas is prevented from flowing out of the outlet.

20 Claims, 13 Drawing Sheets

IN-LINE SOLENOID VALVE

FIELD OF THE INVENTION

The present invention relates generally to gas control valves, and more particularly to solenoid actuated gas control valves.

BACKGROUND OF THE INVENTION

A typical solenoid valve used to control a flow of gas is constructed from a body, a poppet, a spring, and an electrical coil. The body includes an inlet, an outlet, and a conduit extending between the inlet and the outlet. The electrical coil is mounted on top of the body such that an axial cavity within the electrical coil is transverse with a central axis of the inlet and the outlet. The poppet is slideably disposed in the axial cavity of the electrical coil and can restrict or permit a gas from flowing through the conduit.

When the electrical coil is energized, the spring is compressed and the poppet is slideably drawn away from a valve seat within the body such that the gas is permitted to flow into the inlet, through the conduit, and from the outlet. In contrast, when the electrical coil is de-energized, the spring expands and the poppet is biased against the valve seat in the body such that the conduit in the body is obstructed and the gas is prevented from flowing.

Unfortunately, the typical solenoid is not very efficient with regard to space. For example, when several solenoid valves are coupled to a manifold, the solenoid valves often have to be staggered or spaced apart due to the large swing radius required when the electrical coil is mounted on top of the body. Further, typical solenoid valves include a noticeable, and even substantial, unwanted and/or detrimental pressure loss inside the solenoid valve due to the change in direction of the gas flow. Thus, a solenoid valve that is much more space efficient and has a reduced internal pressure loss would be desirable.

The invention provides such a solenoid valve. These and other advantages of the invention, as well as additional inventive features, will be apparent from the description of the invention provided herein.

BRIEF SUMMARY OF THE INVENTION

In one aspect, the invention provides a gas control valve comprising a housing, a hollow plunger inside the housing, a spring, and a solenoid coil. The housing has an inlet, a seat, and an outlet. The hollow plunger has a fixed segment and a poppet segment. The poppet segment includes a poppet conduit and is slideable within the housing. The spring encircles the poppet segment and biases the poppet segment toward the seat. The solenoid coil encircles the housing.

The gas control valve is alternatively energizable and de-energizable. When energized, the poppet segment is slideably biased toward the fixed segment such that the poppet segment disengages from the seat and a gas is permitted to flow through the hollow plunger. When de-energized, the spring is allowed to bias the poppet segment away from the fixed segment such that the poppet segment engages with the seat to prevent the gas from flowing out of the outlet.

In another aspect, the invention provides a gas control valve comprising a housing, a hollow plunger, and a spring. The housing includes a central portion having coil encircling a housing conduit, an inlet fitting having an inlet, a guide assembly having a plunger guide and a spring guide, and an outlet fitting having an outlet and a seat. The plunger guide is insertable into the housing conduit and the outlet fitting is securable to the spring guide. The outlet fitting and the spring guide form a housing cavity.

The hollow plunger has a fixed segment with a first channel and a poppet segment having a second channel in line with the first channel. The fixed segment is disposed in the plunger guide and securable to the inlet fitting. The poppet segment is slideable within the plunger guide. The poppet segment includes a poppet conduit defined therein. The spring is disposed in the housing cavity and encircles the poppet segment. The spring biases the poppet segment toward the seat.

In a further aspect, the invention provides a gas control valve comprising a housing, a hollow plunger inside the housing, a spring, and a solenoid coil. The housing has an inlet, a seat, and an outlet. The hollow plunger has a fixed segment and a poppet segment. The fixed segment includes a fixed conduit and is stationary in the housing. The poppet segment includes a poppet conduit and a poppet gasket. The poppet segment is slideable within the housing relative to the fixed segment. The fixed conduit and the poppet conduit are axially-aligned with each other. The spring encircles the poppet segment and biases the poppet segment toward the seat. The solenoid coil encircles the housing.

The gas control valve is alternatively energizable and de-energizable. When energized, the poppet segment is slideably biased toward the fixed segment such that the poppet gasket on the poppet segment disengages from the seat and a gas is permitted to flow through the fixed segment and the poppet segment of the hollow plunger. When de-energized, the spring is allowed to bias the poppet segment away from the fixed segment such that the poppet gasket on the poppet segment engages with the seat to prevent the gas from flowing out of the outlet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
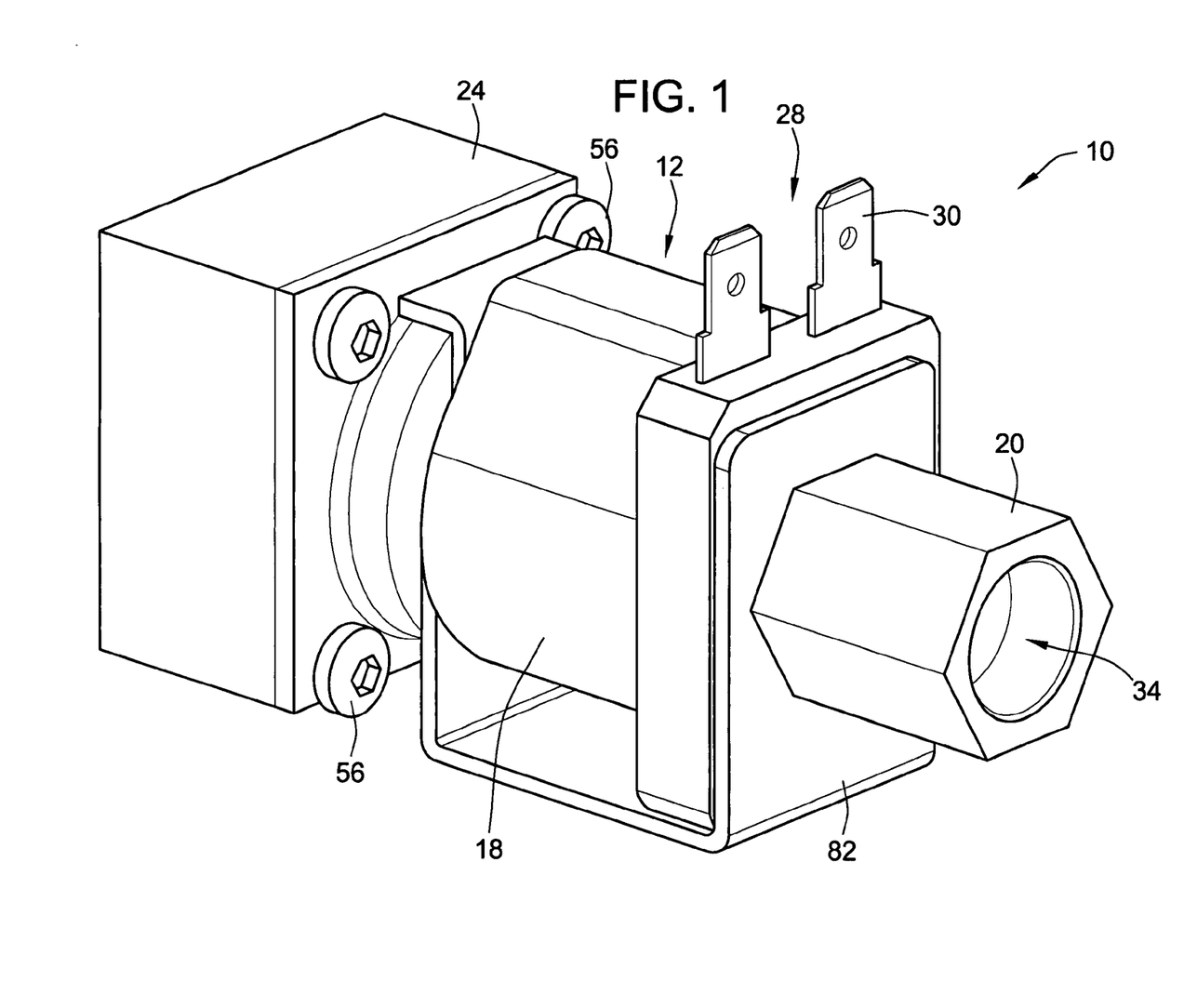
FIG. 1 is a perspective view of an exemplary embodiment of a solenoid valve constructed in accordance with the teachings of the present invention.
Figure 2:
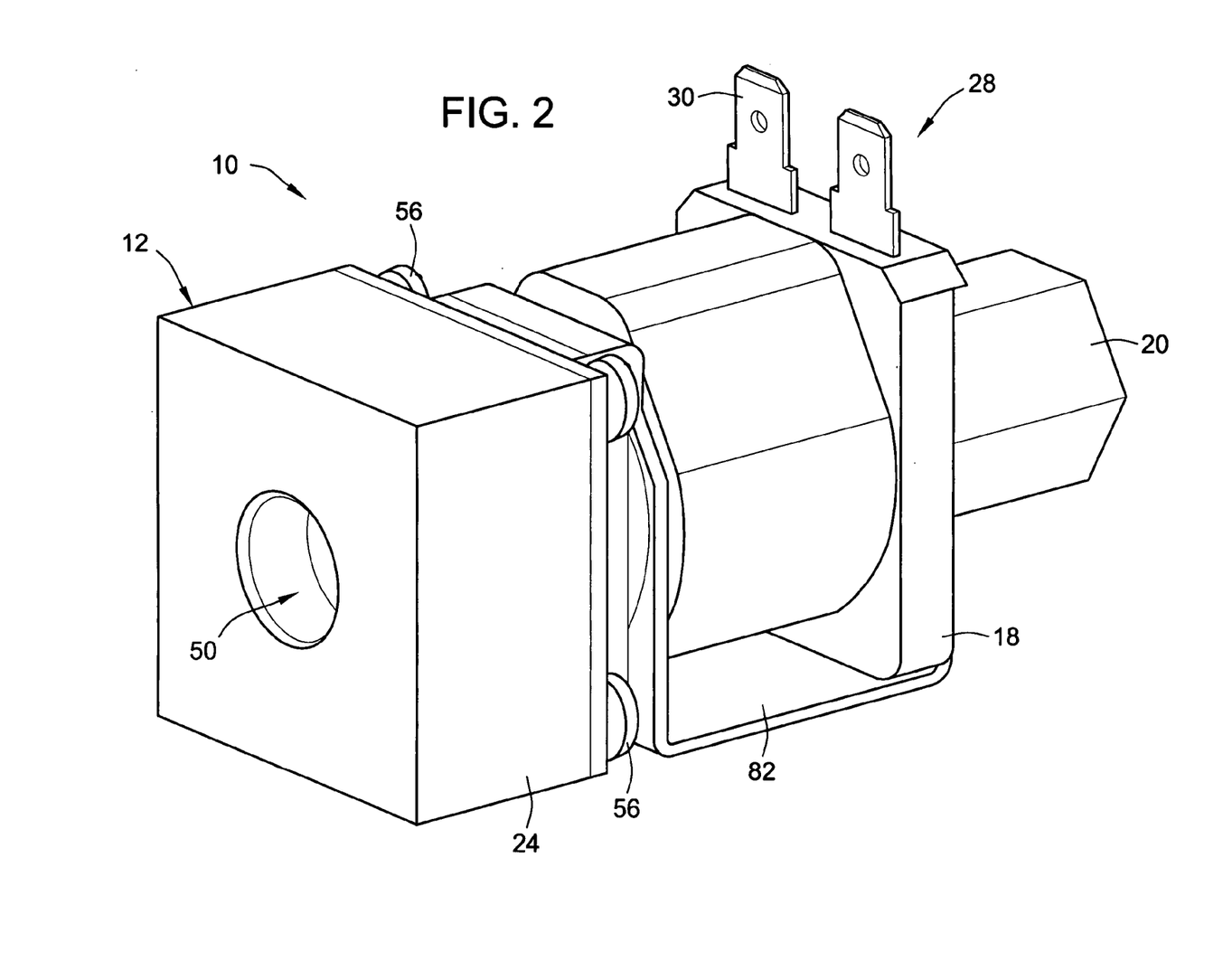
FIG. 2 is a perspective view of the solenoid valve of FIG. 1 taken from a different vantage point.
Figure 3:
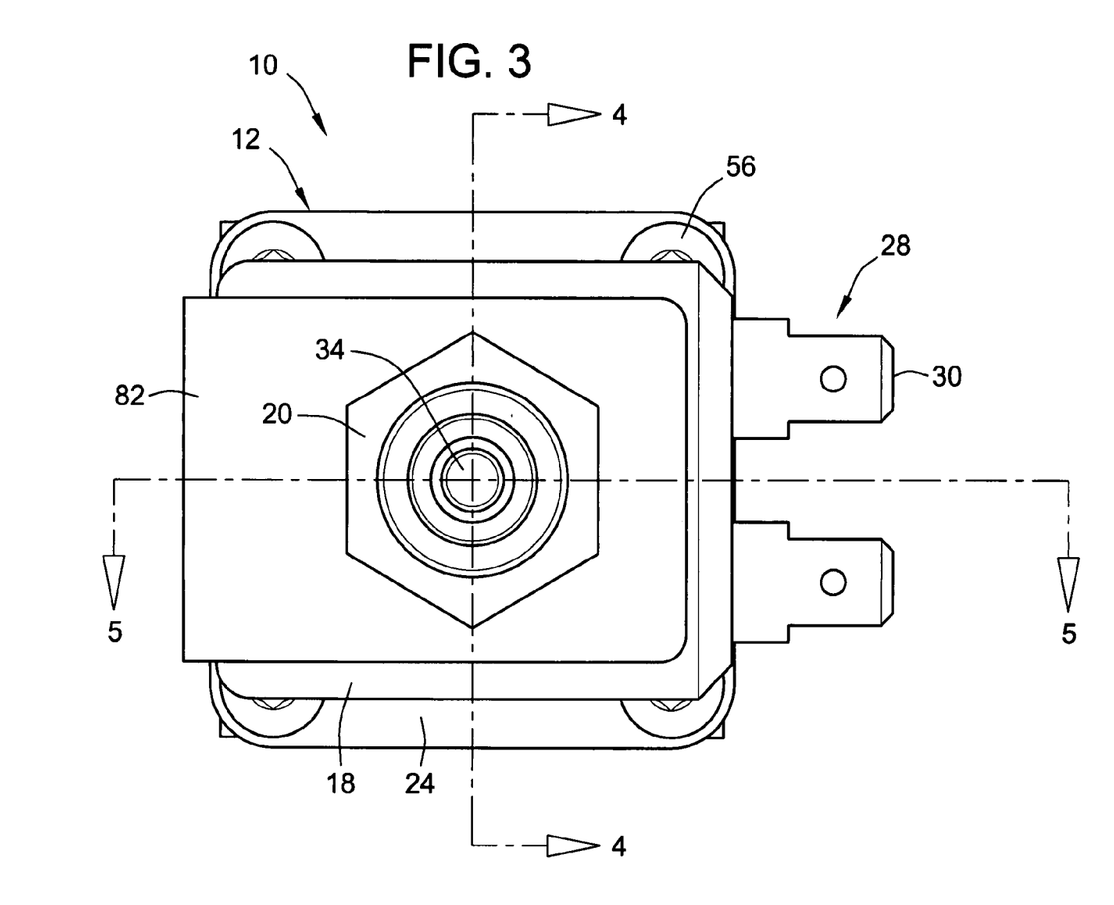
FIG. 3 is a top plan view of the solenoid valve of FIGS. 1 and 2.

Referring to FIGS. 1–3, an embodiment of a solenoid valve 10 constructed in accordance with the teachings of the present invention is shown. While such a valve may be used in various environments, the following description will describe one application of the valve 10 for use with an appliance, such as a gas range. The solenoid valve 10 (i.e., gas control valve) comprises a housing 12 having a central portion 18, an inlet fitting 20, and an outlet fitting 24. Preferably, the inlet fitting 20 is threaded at inlet 34.

An electrical connector 28 having a pair of terminals 30 extend from the housing 12. The solenoid valve 10 also includes a clamp 82. The clamp 82 completes and/or directs a magnetic flux path (not shown) and assists the solenoid valve 10 in opening the hollow plunger 14 to allow gas to flow. The clamp 82 generally snaps, clicks, and/or slides into engagement with one or more components of the solenoid valve 10. The outlet fitting is secured to the central portion 18 of the housing 12 via fasteners (e.g., screws 56). The outlet fitting, as may be seen from FIG. 2, includes the outlet 50. Preferably, this outlet 50 is threaded.

Figure 4:
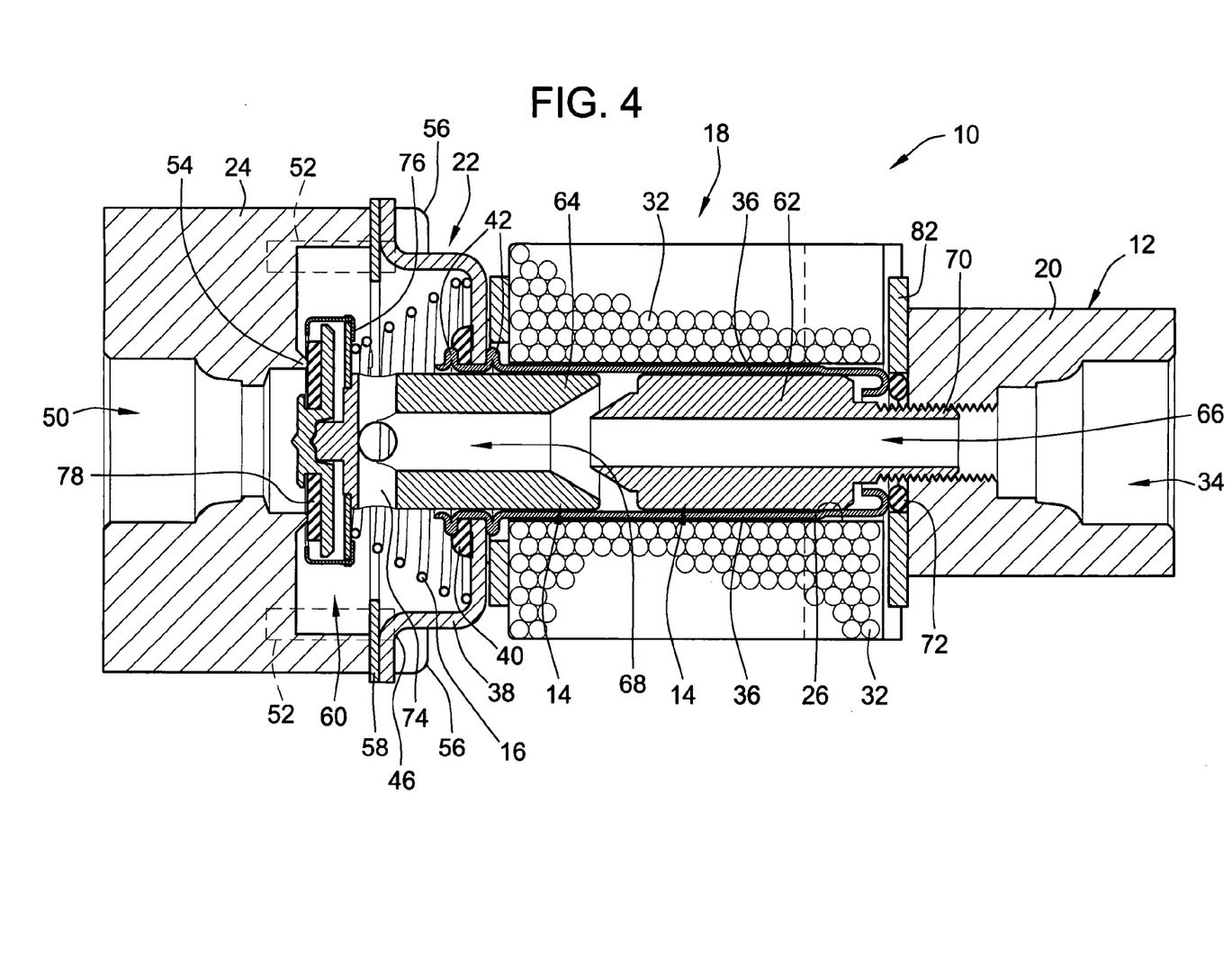
FIG. 4 is a cross-sectional view of the solenoid valve of FIG. 3 taken along line 4—4 illustrating the solenoid valve in a closed position.
Figure 5:
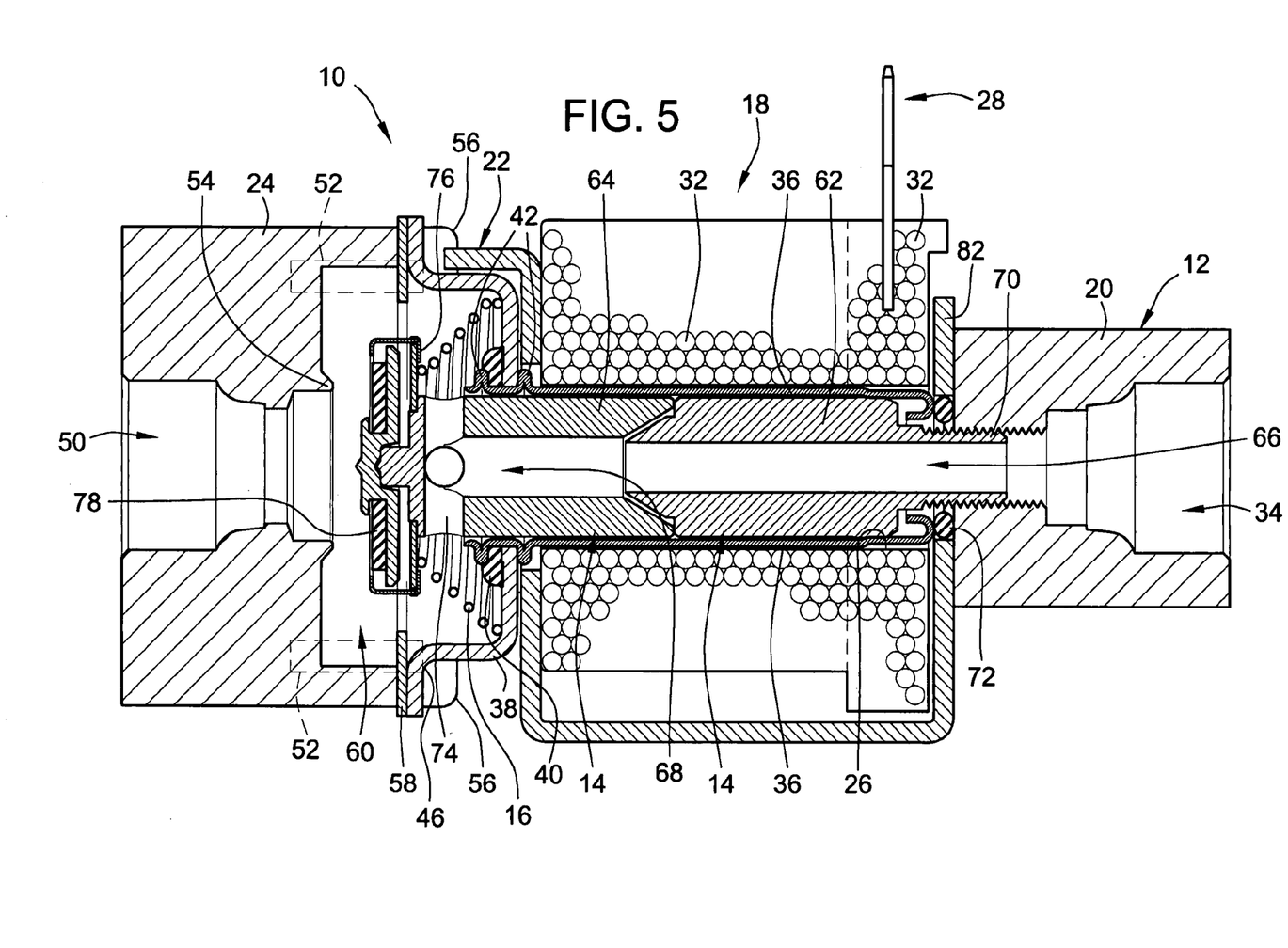
FIG. 5 is a cross-sectional view of the solenoid valve of FIG. 3 taken along line 5—5 illustrating the solenoid valve in an open position.
Figure 6:
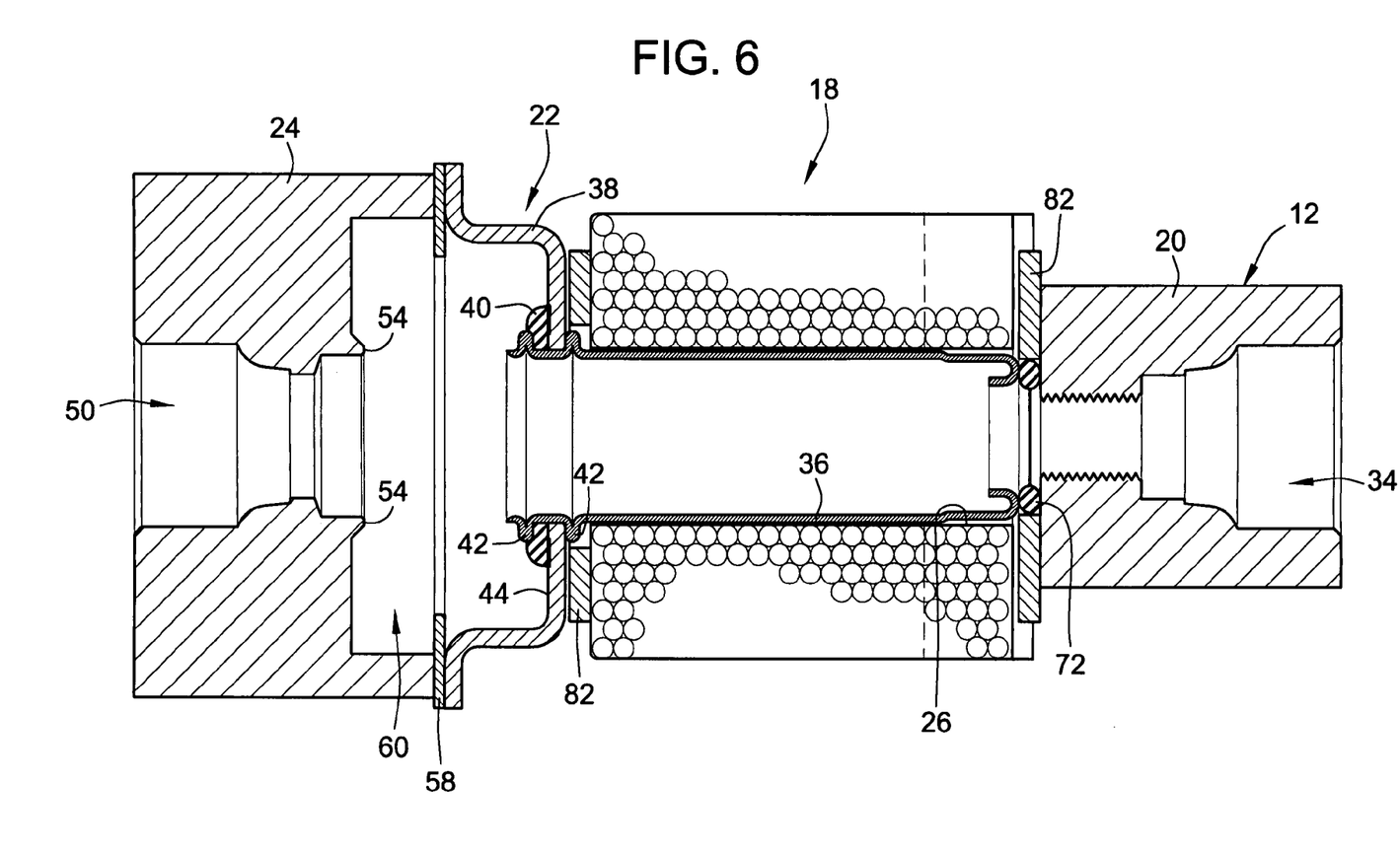
FIG. 6 is a cross-sectional view of the solenoid valve of FIGS. 4 and 5 with the hollow plunger and spring removed.
Figure 7:
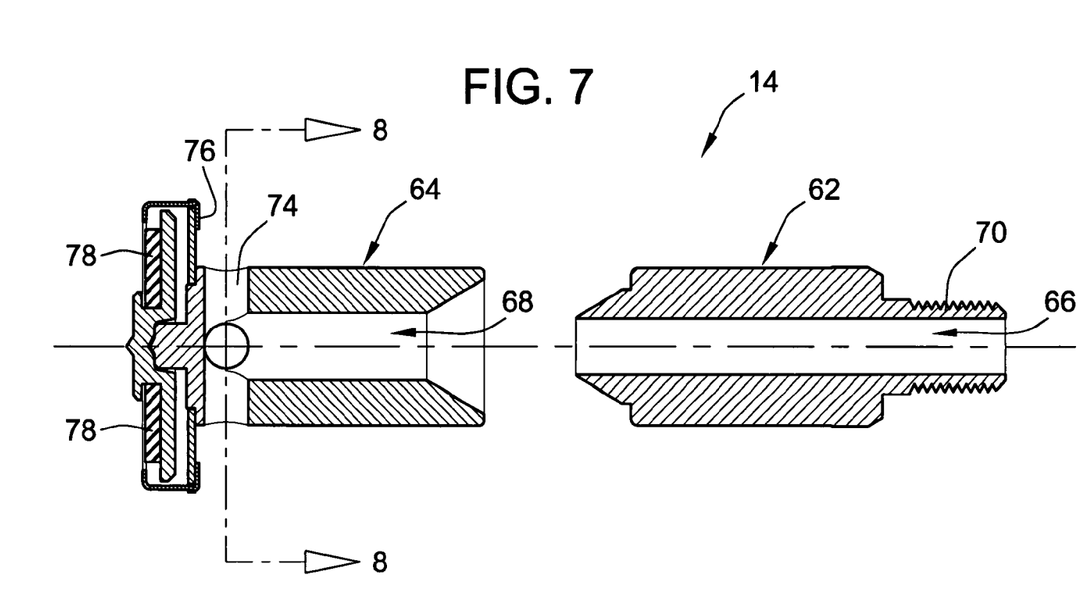
FIG. 7 is a cross-sectional view of the hollow plunger extracted from the solenoid valve of FIGS. 4 and 5.
Figure 8:
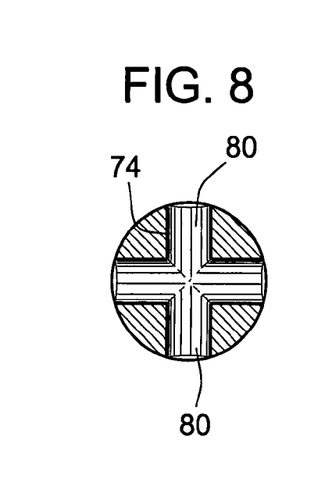
FIG. 8 is a cross-sectional view of a poppet conduit on the hollow plunger of FIG. 7.
Figure 9:
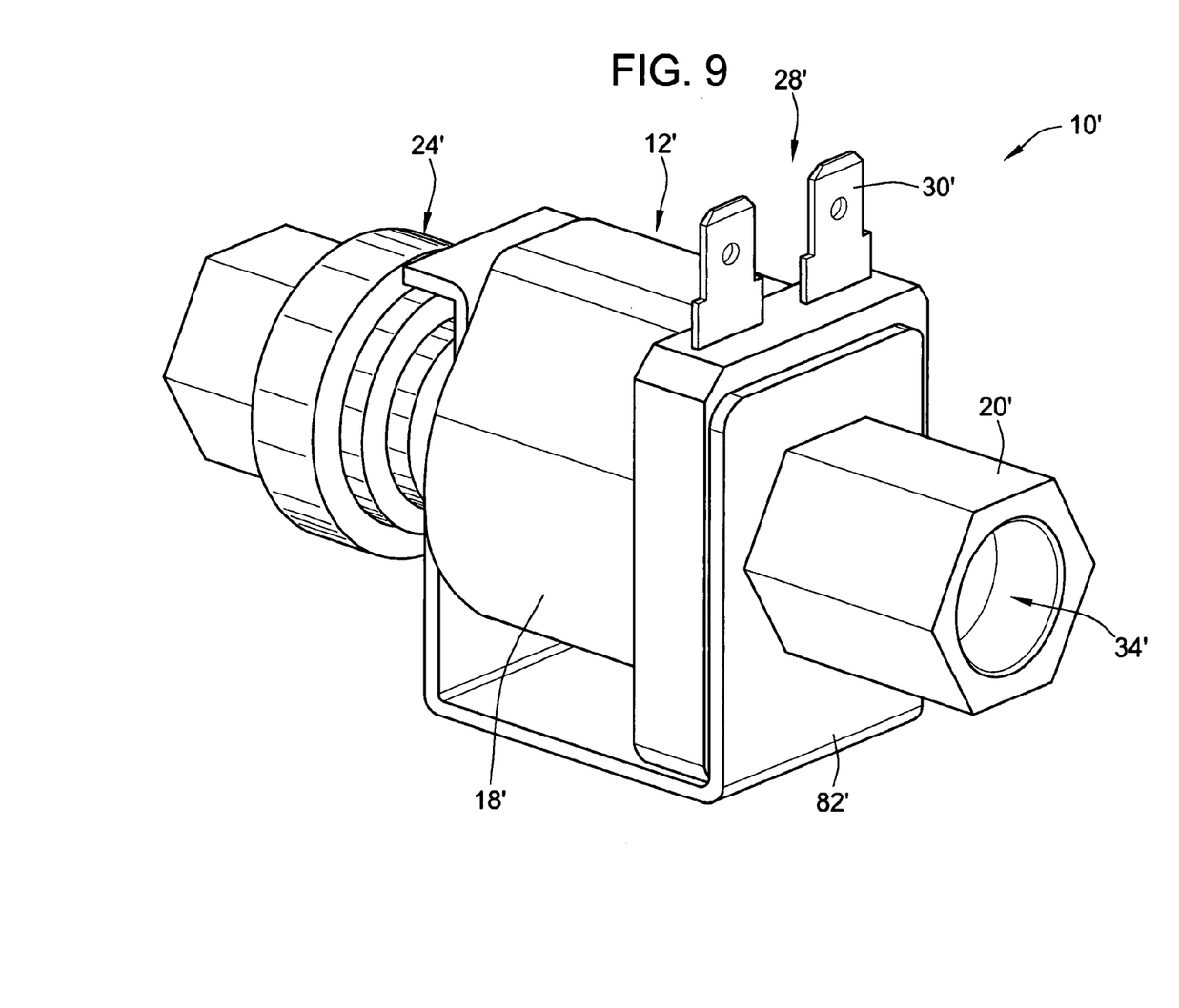
FIG. 9 is a perspective view of another embodiment of a solenoid valve constructed in accordance with the teachings of the present invention.

To gain a better understanding of this embodiment of the valve of the present invention, reference is now made to the cross sectional illustrations of FIGS. 4 and 5, taken about section line 4–4 and section line 5–5 of FIG. 3, respectively. As will become apparent from the following discussion, FIG. 4 illustrates the valve 10 in a de-energized or closed position, while FIG. 5 illustrates the valve 10 in an energized or open position. To simplify the illustrations to aid in understanding the construction of this embodiment of the present invention, the cross sectional illustration of FIG. 6 is provided that excludes the valving elements of the assembly 10. Similarly, the cross sectional illustrations of FIG. 7 and FIG. 8 are provided illustrating the valving elements alone.

A housing conduit 26 extends axially and centrally through the central portion 18. The central portion 18 comprises an encapsulated coil 32 that defines the housing conduit 26. The inlet fitting 20 has an inlet 34 that is dimensioned and positioned to substantially axially align with the housing conduit 26. The inlet 34 is configured to receive a gas delivery conduit (not shown) and, in preferred embodiments, is threaded or otherwise constructed to couple with that a gas delivery conduit.

The guide assembly 22 includes a plunger guide 36, a spring guide 38, and a gasket 40. The plunger guide 36 is a tubular-shaped component that is insertable into the housing conduit 26 in the central portion 18. The plunger guide 36 is preferably friction fit within the housing conduit 26 and includes a pair of flanges 42 that are in spaced opposing relation. The spring guide 38 includes a spring base 44 and apertures 46. A distal end portion 48 of the spring guide 38 and the gasket 40 are disposed between the pair of flanges 42 such that the gasket is compressed and a gas impervious seal is formed.

The outlet fitting 24 has an outlet 50, threaded bores 52, and a seat 54. The outlet 50 is dimensioned and positioned to substantially axially align with the housing conduit 26. The outlet 50 is configured to expel the gas and is, in a preferred embodiment, threaded or otherwise constructed to couple with a gas expulsion conduit, a burner, and the like (not shown). The outlet fitting 24 and the spring guide 38 are secured to each other using, for example, securing components such as screws 56. The screws are inserted into threaded bores 52 through the apertures 46 and threadably driven into the outlet fitting 24. In a preferred embodiment, an outlet gasket 58 having gasket apertures is disposed between the outlet fitting 24 and the spring guide 38. When the spring guide 38 and the outlet fitting 24 are secured together, the outlet gasket 58 is compressed and a gas-impervious seal is formed. With the gas impervious seal in place, the outlet fitting 24 and the guide assembly 22 together form a housing cavity 60 within the housing 12.

The hollow plunger 14 is generally disposed within the housing 12 and, in particular, the housing conduit and/or the plunger guide 36. The hollow plunger 14 comprises a fixed segment 62 and a poppet segment 64 that have mating plunger channels 66, 68. Preferably, the fixed segment 62 is outwardly tapered at one end while the poppet segment 64 is correspondingly inwardly tapered at one end as shown in FIGS. 4 and 5.

A distal portion 70 of the fixed segment 62 protrudes from the central portion 18 proximate the inlet fitting 20 and is, preferably, threadably mated with the inlet fitting 20. In preferred embodiments, an O-ring 72 encircles the distal portion 70 of the fixed segment 62 to form a gas-impervious seal between the inlet fitting 20 and the central portion 18 and/or the plunger guide 36.

The poppet segment 64 resides, at least partially, within the housing cavity 60 and, at least partially, within the housing conduit 26 and/or plunger guide 36. The poppet segment 64 includes a poppet conduit 74, a poppet base 76, and a poppet gasket 78. The poppet conduit 74 includes poppet channels 80 that, in a preferred embodiment, form a "tee" as shown in FIG. 8. The poppet channels 80 place the plunger channels 66, 68 in fluid communication with the housing cavity 60. As shown, the poppet channels 80 are generally transverse to the plunger channel 68 and/or the housing conduit 26.

The poppet gasket 78 is dimensioned and positioned to, at times, engage with the seat 54 on the outlet fitting 24 to form a gas-impervious seal. The poppet gasket 78 is able, at other times, to disengage from the seat 54. The poppet gasket 78 is preferably made of a seal promoting material such as, for example, rubber, cork, plastic, and the like.

The spring 16 within the solenoid valve 10 generally resides in the housing cavity 60, axially encircles the poppet segment 64, and is disposed between the poppet base 76 and the spring base 44. As such, the spring 16 biases the poppet segment 64 toward the outlet fitting 24 and, in particular, the poppet gasket 78 against the seat 54. When the poppet segment 64 and spring 16 are inserted into the solenoid valve 10, the spring 16 preferably at least slightly compressed. As such, the spring 16 continuously biases, or attempts to bias, the poppet segment 64 toward the outlet 50 and, correspondingly, the gasket 78 against the seat 54.

In operation, the solenoid valve 10 as depicted in FIGS. 1–5 is alternatively energized and de-energized. Specifically, the solenoid valve 10 is energized to manipulate the solenoid valve into an "open" position (FIG. 5) and de-energized to return the solenoid valve to a "closed" position (FIG. 4).

The solenoid valve 10 is energized by applying a voltage to terminals 30 of the electrical connector 28. The difference in voltage between the two terminals 30 causes a current to flow through the coil 32. The current flowing through the coil 32 results in generation of a magnetic field about the solenoid valve 10, and in particular, about the central portion 18. When the magnetic field becomes great enough to overcome the bias provided by the spring 16, the spring 16 is compressed and/or further compressed and the poppet segment 64 slides toward the fixed segment 62. When this occurs, the gasket 78 disengages from the seat 54 and permits a gas to flow through the solenoid valve 10. Specifically, the gas flows though the inlet 34, the hollow plunger 14 (i.e., the plunger channel 66 of the fixed segment 62 and the plunger channel 68 of the poppet segment 64), the poppet conduit 74, the housing cavity 60, and the outlet 50.

In contrast, the solenoid valve 10 is de-energized by removing the voltage from across the terminals 30 of the electrical connector 28. The lack of a difference in voltage between the two terminals 30 prevents a current from flowing through the coil 32. Therefore, no magnetic field is created or any magnetic field surrounding the central portion 18 dissipates and/or disappears.

With the magnetic field weakened and/or entirely gone, the poppet segment 64 can no longer resist the resilient force of the spring 16 biasing the poppet segment toward the seat 54. Therefore, the spring 16 expands and biases the poppet segment 64 away from the fixed segment 62. Eventually, the gasket 78 engages with the seat 54 to form a gas impervious seal and prevent the gas from flowing out of the outlet 50. The seat 54 is specifically designed such that a pressure loss through the solenoid valve 10, due to changes in direction of flow of the gas, is minimized and/or reduced. The solenoid valve 10 can be repeatedly energized and de-energized to control or manage the flow of gas.

FIGS. 9–13 illustrate an alternate embodiment of a solenoid valve 10' constructed in accordance with the present invention. The solenoid valve 10' generally operates in the same manner as solenoid valve 10 (FIGS. 1–5) and, as such, like parts are correspondingly numbered where possible.

Figure 12:
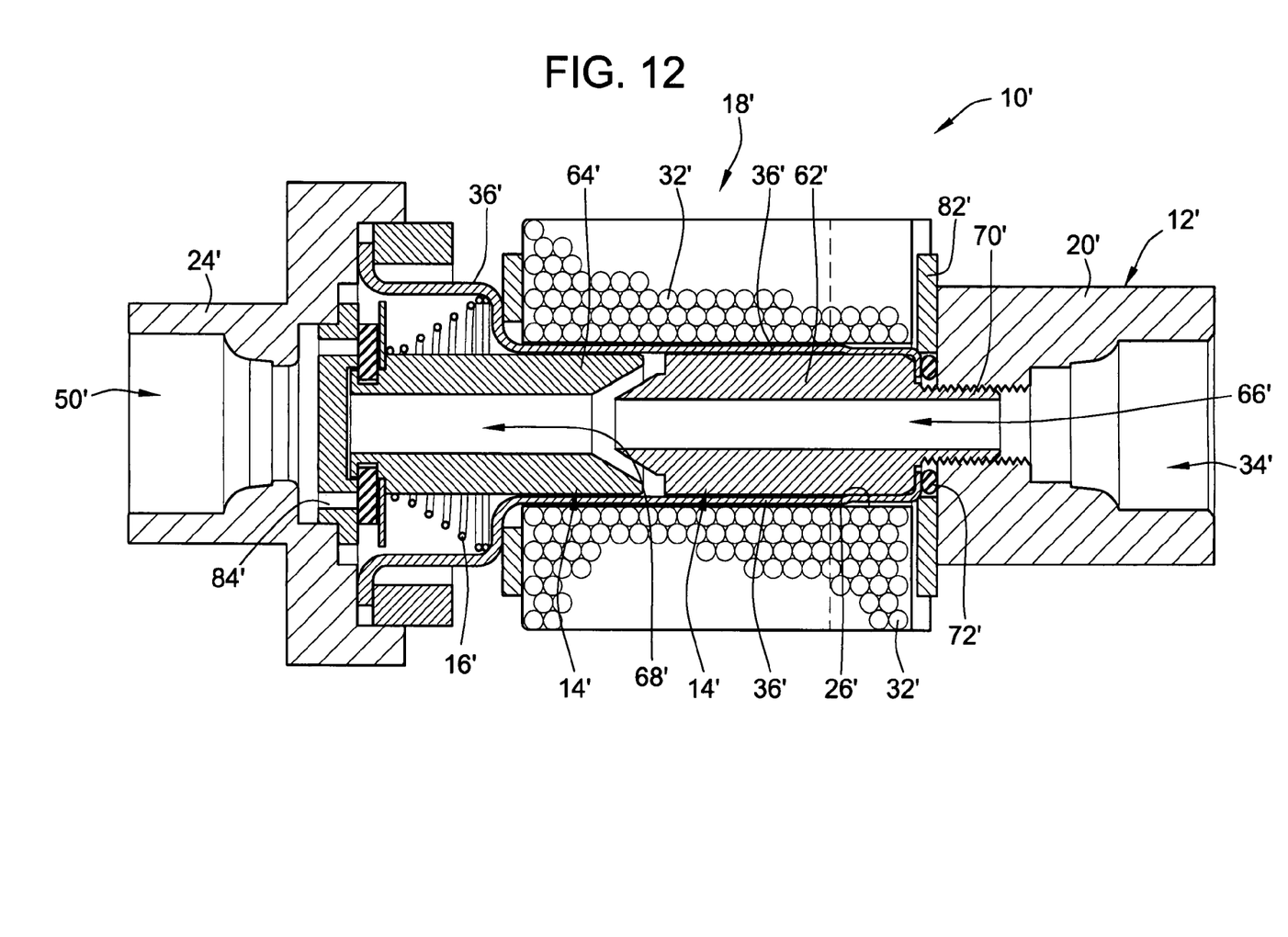
FIG. 12 is a cross-sectional view of the solenoid valve of FIG. 11 taken along line 12—12 illustrating the solenoid valve in a closed position.

In the solenoid valve 10', the screws 56 found in the solenoid valve 10 (FIG. 1) have been eliminated. Likewise, the spring guide 38 (FIG. 4) has been replaced by a reconfigured plunger guide 36' (FIG. 12). Moreover, the outlet fitting 24' is configured differently. The outlet fitting 24' includes slots 86 that engage a portion of the plunger guide 36' and secure the central portion to the outlet fitting. The outlet fitting 24' also includes one or more apertures 84 that are circumferentially disposed outside the diameter of the plunger channel 68'. In other words, the apertures 84 are shifted away from the axial center of the poppet segment 64'.

Figure 13:
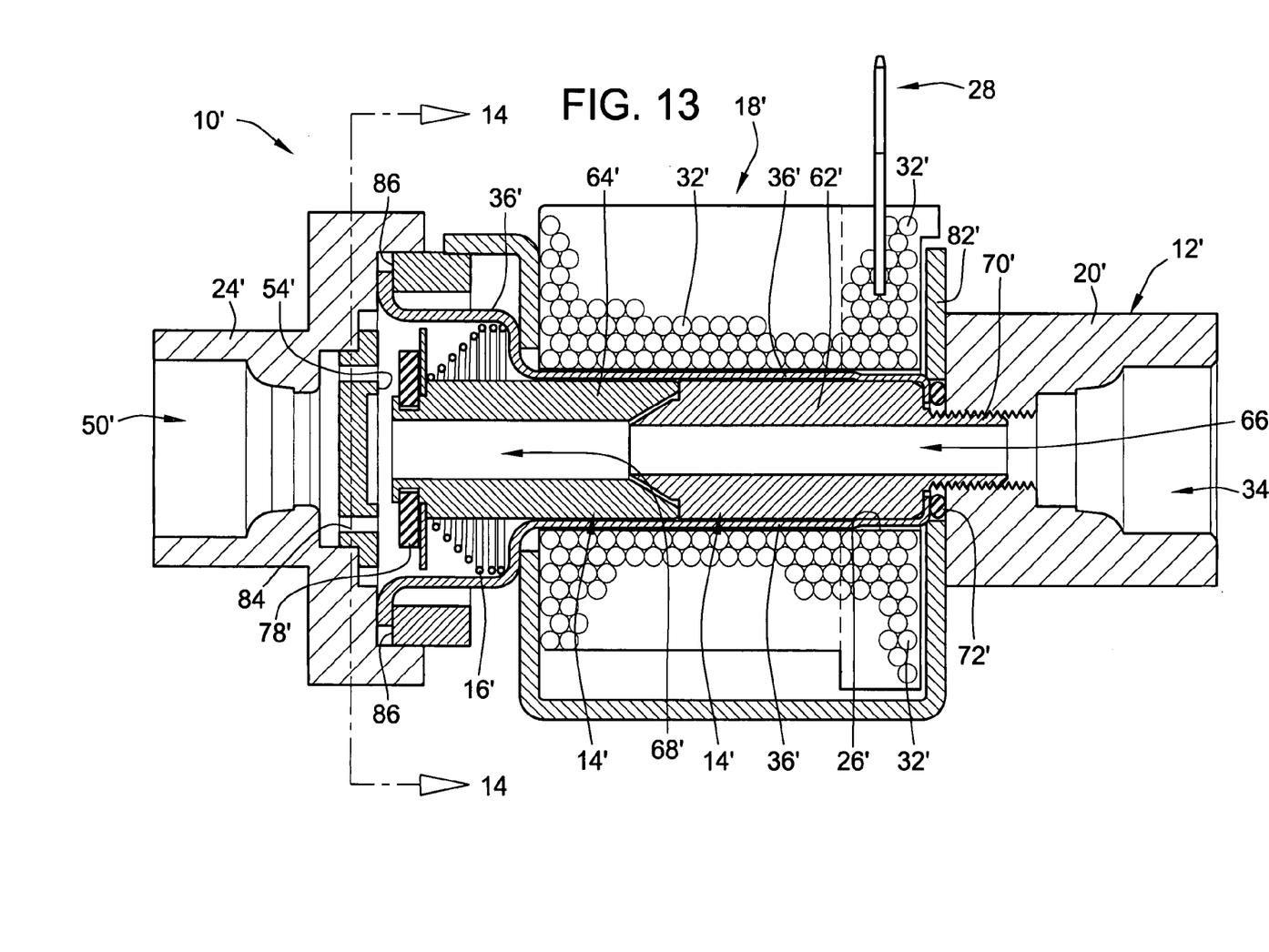
FIG. 13 is a cross-sectional view of the solenoid valve of FIG. 11 taken along line 12—12 illustrating the solenoid valve in an open position.
Figure 14:
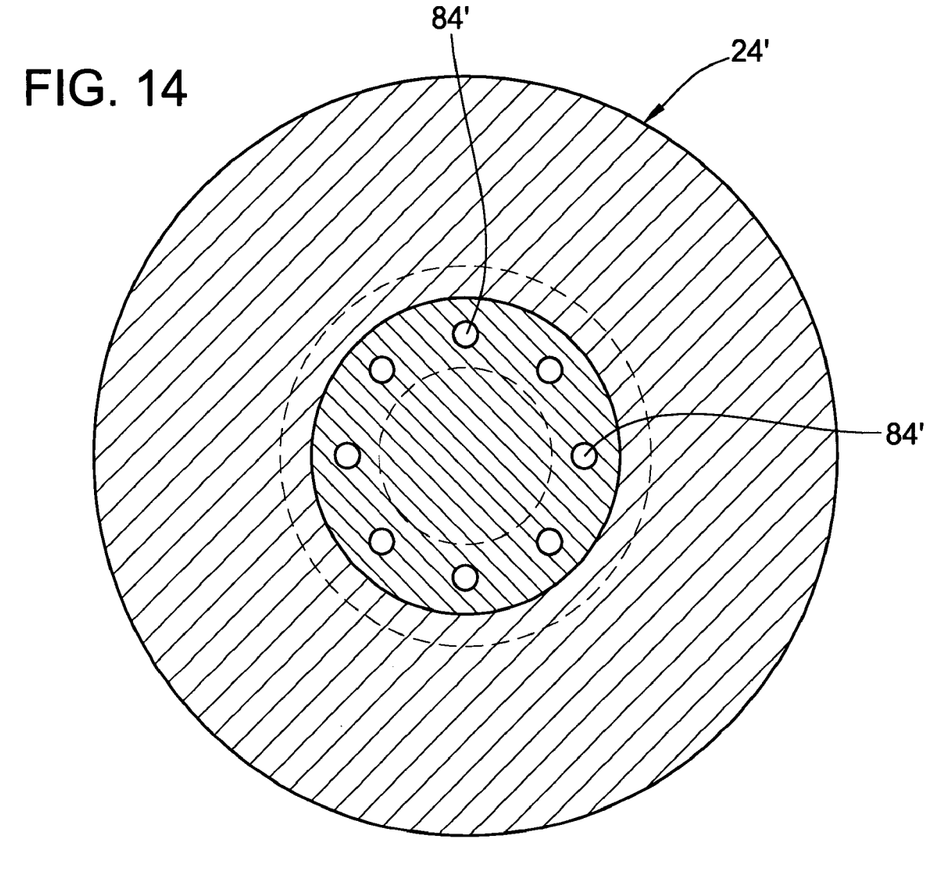
FIG. 14 is a cross-sectional view of an outlet fitting on the solenoid valve of FIG. 13.

As shown in FIGS. 12 (valve closed) and 13 (valve open), the poppet segment 64' has a plunger channel 68' that extends entirely through the axial center of the poppet segment (as opposed to the poppet segment 62 having a poppet conduit 74 as shown in FIG. 4). Therefore, the gas that, at times, flows through the poppet segment 64' can do so without changing direction.

Figure 10:
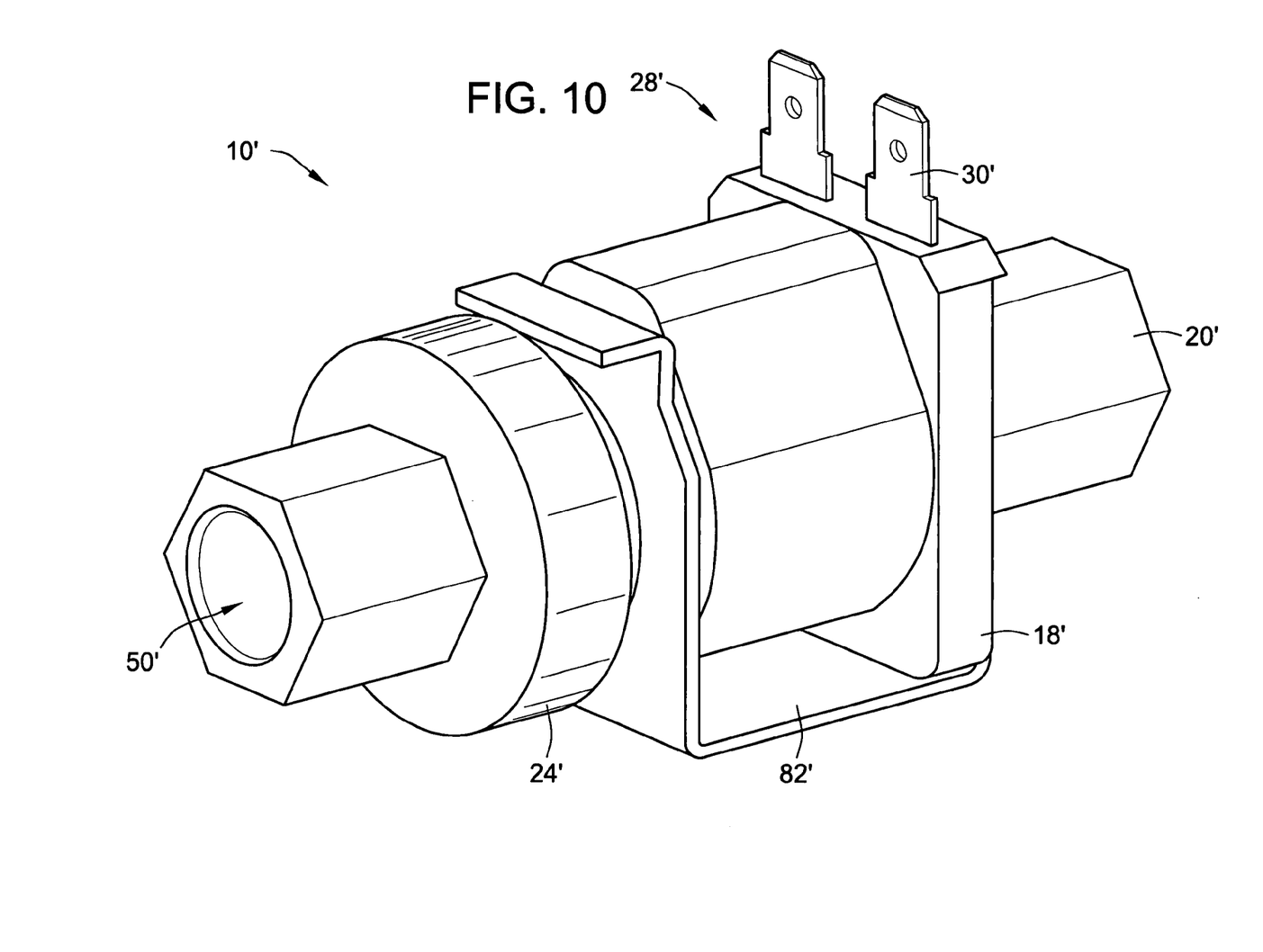
FIG. 10 is a perspective view of the solenoid valve of FIG. 9 taken from a different vantage point.
Figure 11:
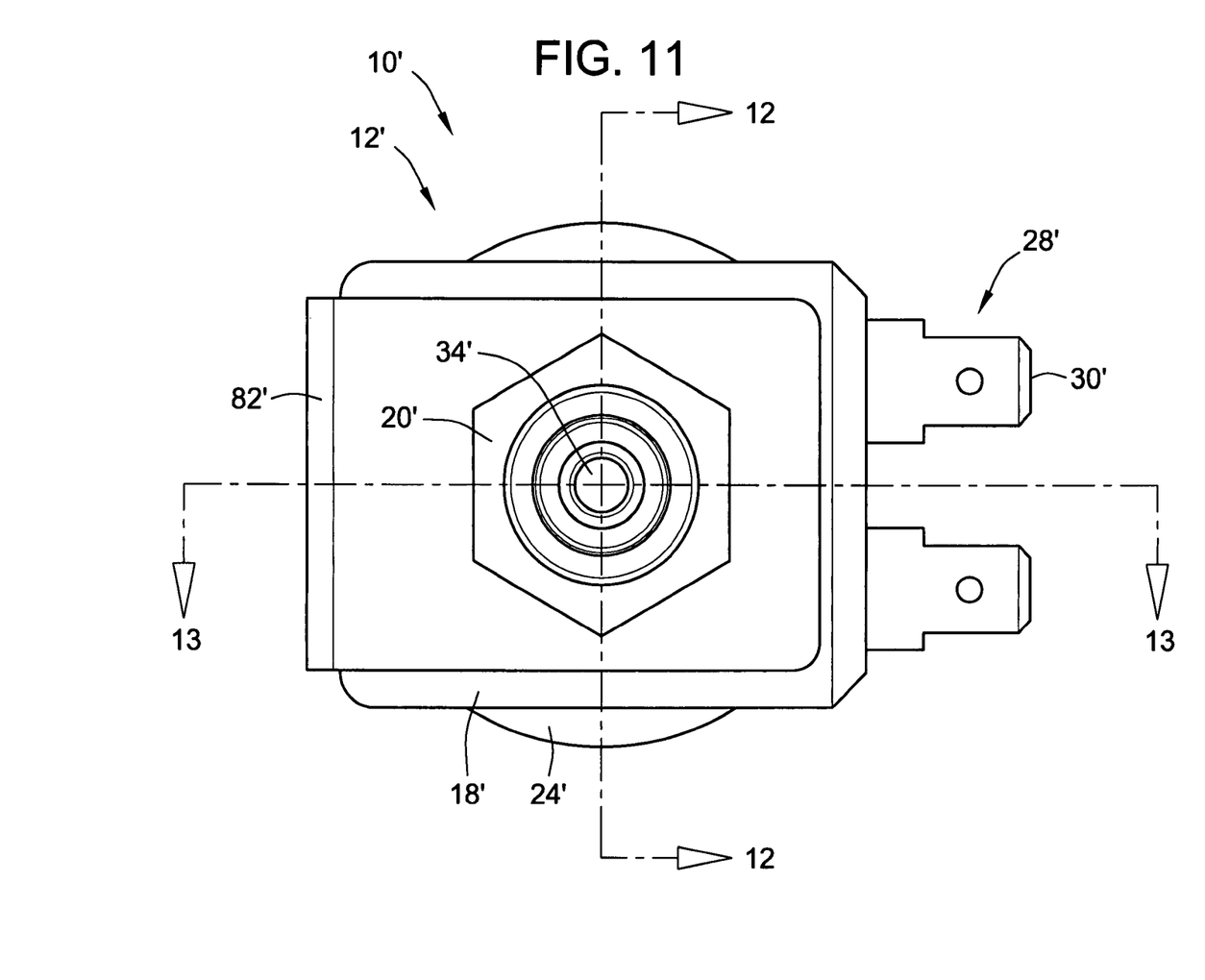
FIG. 11 is a top plan view of the solenoid valve of FIGS. 9 and 10.

To accommodate for the plunger channel 68' extending completely through the poppet segment 64', the outlet fitting 24' is provided with one or more apertures 84 that are circumferentially disposed outside the diameter of the plunger channel 68'. In other words, the apertures 84 are shifted away from the axial center of the poppet segment 64' and align with gasket poppet gasket 78'. While eight of the apertures 84 are formed and/or machined into the outlet fitting 24', as shown in FIG. 10, more or fewer of the apertures can be employed.

In operation, the solenoid valve 10' as depicted in FIGS. 9–13 is alternatively energized and de-energized. Specifically, the solenoid valve 10' is energized to manipulate the solenoid valve into an "open" position (FIG. 13) and de-energized to return the solenoid valve to a "closed" position (FIG. 12).

When energized, the spring 16' is compressed and/or further compressed and the poppet segment 64' slides toward the fixed segment 62'. When this occurs, the gasket 78' disengages from the seat 54' and permits a gas to flow through the solenoid valve 10. Specifically, the gas flows though the inlet 34', the hollow plunger 14' (i.e., the plunger channel 66' of the fixed segment 62' and the plunger channel 68' of the poppet segment 64'), the apertures 84, the housing cavity 60', and the outlet 50'.

In contrast, when the solenoid valve 10' is de-energized, the poppet segment 64' can no longer resist the resilient force of the spring 16' biasing the poppet segment toward the seat 54'. Therefore, the spring 16' expands and biases the poppet segment 64' away from the fixed segment 62'. Eventually, the gasket 78' engages with the seat 54' to form a gas impervious seal and prevent the gas from flowing out of the outlet 50'. The solenoid valve 10' can be repeatedly energized and de-energized to control or manage the flow of gas.

One application for the solenoid valves 10, 10' would be in a gas range that has multiple burners that are independently controlled. Since the hollow plungers 14, 14' make the solenoid valves 10, 10' very space efficient, several of the solenoid valves 10, 10' can be coupled with a manifold and/or other distribution system to produce a very space-efficient design.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A gas control valve comprising:
    a housing having an inlet, a seat, and an outlet;
    a hollow plunger inside the housing, the hollow plunger having a fixed segment and a poppet segment, the poppet segment including a poppet conduit and slideable within the housing;
    a spring encircling the poppet segment, the spring biasing the poppet segment toward the seat; and
    a solenoid coil encircling the housing; and wherein the gas control valve is alternatively:
    energizable to slideably bias the poppet segment toward the fixed segment such that the poppet segment disengages from the seat and a gas is permitted to flow through the hollow plunger; and
    de-energizable to allow the spring to bias the poppet segment away from the fixed segment such that the poppet segment engages with the seat to prevent the gas from flowing out of the outlet.

2. The valve of claim 1, wherein the housing further comprises a housing conduit, the fixed segment and at least a portion of the poppet segment residing in the housing conduit.

3. The valve of claim 1, wherein the housing further comprises a housing cavity, at least a portion of the poppet segment extending into the housing cavity.

4. The valve of claim 3, wherein the spring is disposed in the housing cavity between a poppet base on the poppet segment and a spring base on the housing.

5. The valve of claim 1, wherein the inlet, the housing cavity, and the outlet are axially aligned along a central axis of the housing.

6. The valve of claim 1, wherein the poppet segment includes a poppet gasket, the gasket engaging with the seat.

7. The valve of claim 1, wherein the fixed segment includes a threaded end and a poppet mating end and wherein the poppet segment includes a mating end angled to receive the poppet mating end.

8. The valve of claim 1, wherein the poppet conduit is transverse to poppet segment.

9. The valve of claim 1, wherein the poppet conduit includes channels that intersect with each other.

10. The valve of claim 1, wherein the poppet segment includes a poppet gasket.

11. The valve of claim 1, wherein the coil encircles the housing between the inlet and the outlet in axial alignment therewith.

12. A gas control valve comprising:
    a housing including:
        a central portion having coil encircling a housing conduit;
        an inlet fitting having an inlet;
        a guide assembly having a plunger guide and a spring guide, the plunger guide insertable into the housing conduit;
        an outlet fitting having an outlet and a seat, the outlet fitting securable to the spring guide, the outlet fitting and the spring guide forming a housing cavity;
    a hollow plunger having a fixed segment with a first channel and a poppet segment having a second channel in line with the first channel, the fixed segment disposed in the plunger guide and securable to the inlet fitting, the poppet segment slideable within the plunger guide, the poppet segment including a poppet conduit defined therein; and
    a spring disposed in the housing cavity and encircling the poppet segment, the spring biasing the poppet segment toward the seat.

13. The valve of claim 12, wherein the fixed segment is threadably mated with the inlet fitting.

14. The valve of claim 12, wherein a portion of the poppet segment is tapered to mate with a portion of the fixed segment that is correspondingly tapered.

15. The valve of claim 12, wherein the housing further comprises a clamp employed to direct magnetic flux.

16. The valve of claim 12, wherein the inlet, the housing conduit, and the outlet are axially aligned.

17. A gas control valve comprising:
    a housing having an inlet, a seat, and an outlet;
    a hollow plunger inside the housing, the hollow plunger having a fixed segment and a poppet segment, the fixed segment including a fixed conduit and stationary in the housing, the poppet segment including a poppet conduit and a poppet gasket, the poppet segment slideable within the housing relative to the fixed segment, the fixed conduit and the poppet conduit axially-aligned with each other;
    a spring encircling the poppet segment, the spring biasing the poppet segment toward the seat; and
    a solenoid coil encircling the housing; and wherein the gas control valve is alternatively:
    energizable to slideably bias the poppet segment toward the fixed segment such that the poppet gasket on the poppet segment disengages from the seat and a gas is permitted to flow through the fixed segment and the poppet segment of the hollow plunger; and
    de-energizable to allow the spring to bias the poppet segment away from the fixed segment such that the poppet gasket on the poppet segment engages with the seat to prevent the gas from flowing out of the outlet.

18. The valve of claim 17, wherein the inlet, the housing cavity, and the outlet are axially aligned along a central axis of the housing.

19. The valve of claim 17, wherein the poppet conduit is transverse to poppet segment.

20. The valve of claim 17, wherein the housing further comprises a clamp employed to direct magnetic flux.

* * * * *